(12) United States Patent
Oldroyd et al.

(10) Patent No.: US 10,669,021 B2
(45) Date of Patent: Jun. 2, 2020

(54) METHOD OF OPTIMIZING AND CUSTOMIZING ROTOR BLADE STRUCTURAL PROPERTIES BY TAILORING LARGE CELL COMPOSITE CORE AND A ROTOR BLADE INCORPORATING THE SAME

(71) Applicant: Bell Helicopter Textron Inc., Fort Worth, TX (US)

(72) Inventors: Paul K. Oldroyd, Azle, TX (US); Wei-Yueh Lee, Arlington, TX (US); James D. Hethcock, Jr., Colleyville, TX (US); John R. McCullough, Weatherford, TX (US); Patrick R. Tisdale, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 843 days.

(21) Appl. No.: 14/022,524

(22) Filed: Sep. 10, 2013

(65) Prior Publication Data

US 2014/0301856 A1 Oct. 9, 2014

Related U.S. Application Data

(60) Provisional application No. 61/701,222, filed on Sep. 14, 2012.

(51) Int. Cl.
*B64C 27/473* (2006.01)
*B64C 3/20* (2006.01)

(52) U.S. Cl.
CPC .............. *B64C 27/473* (2013.01); *B64C 3/20* (2013.01); *B64C 2027/4736* (2013.01); *Y02T 50/43* (2013.01); *Y10T 29/49337* (2015.01)

(58) Field of Classification Search
CPC ......... B64C 27/32; B64C 27/46; B64C 27/00; B64C 27/473
(Continued)

(56) References Cited

U.S. PATENT DOCUMENTS

| 5,346,367 | A | 9/1994 | Doolin et al. | |
| 9,096,316 | B2* | 8/2015 | Lee | B32B 3/12 |
| 2009/0263627 | A1* | 10/2009 | Hand | F02C 7/24 |
| | | | | 428/172 |

FOREIGN PATENT DOCUMENTS

| DE | 1781322 A1 | 1/1971 |
| EP | 0814018 A2 | 12/1997 |
| WO | 2011097433 A1 | 8/2011 |

OTHER PUBLICATIONS

European Search Report in related European Application No. 13184362.5, dated Oct. 13, 2013, 4 pages.
(Continued)

*Primary Examiner* — Ninh H. Nguyen
*Assistant Examiner* — Jason Mikus
(74) *Attorney, Agent, or Firm* — Lightfoot & Alford PLLC

(57) ABSTRACT

An airfoil member can have a root end, a tip end, a leading edge, and a trailing edge. The airfoil member can include an upper skin, a lower skin, and a composite core member having a plurality of cells, an upper surface network of the cells can be bonded to the upper skin, a lower surface network of the cells can be bonded to the lower skin. The composite core can have a septum layer embedded in the cells that form the composite core, the septum layer being configured to provide tailored characteristics of the airfoil member.

19 Claims, 9 Drawing Sheets

(58) Field of Classification Search
USPC .................................................. 416/229 R
See application file for complete search history.

(56) References Cited

OTHER PUBLICATIONS

Examination Communication in related European Application No. 13184362.5, dated Nov. 19, 2013, 6 pages.
Examination Communication in related European Application No. 13184362.5, dated Jun. 26, 2014, 5 pages.
Notice of Allowance in related European Application No. 13184362.5, dated Jan. 29, 2015, 30 pages.
Office Action in related Canadian Application No. 2,826,997, dated Feb. 3, 2015, 4 pages.
Notice of Allowance in related Canadian Application No. 2,826,997, dated Oct. 5, 2015, 1 page.
Chinese Office Action in related Chinese Patent Application No. 201310422068.4, dated Jan. 14, 2016, 3 pages.

* cited by examiner

METHOD OF OPTIMIZING AND CUSTOMIZING ROTOR BLADE STRUCTURAL PROPERTIES BY TAILORING LARGE CELL COMPOSITE CORE AND A ROTOR BLADE INCORPORATING THE SAME

BACKGROUND

Technical Field

The present application relates to a composite rotor blade, as well as a method of making the composite rotor blade.

Description of Related Art

Conventional rotor blades include a spar member that is configured to provide primary structural integrity to the rotor blade. For example, the spar member is typically required to react dynamic operational loads, such as aerodynamic, inertial, and centrifugal loads. However, a spar member must typically be separately cured prior to assembly with the other rotor blade members, which can increase manufacturing costs. Further, spar members are only part of the rotor blade body, thus considerable effort must be made to integrate structural load paths between the spar member and the rest of the rotor blade body and skins.

Hence, there is a need to improve structural efficiency in a rotor blade, as well as decrease expenses associated with the manufacturing of a rotor blade.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

One illustrative embodiment of the present application includes a rotor blade having a body portion of primarily composite core. Another illustrative embodiment includes a method of manufacturing the rotor blade. Another illustrative embodiment includes a method of tailoring composite core for use in a rotor blade.

Figure 1:
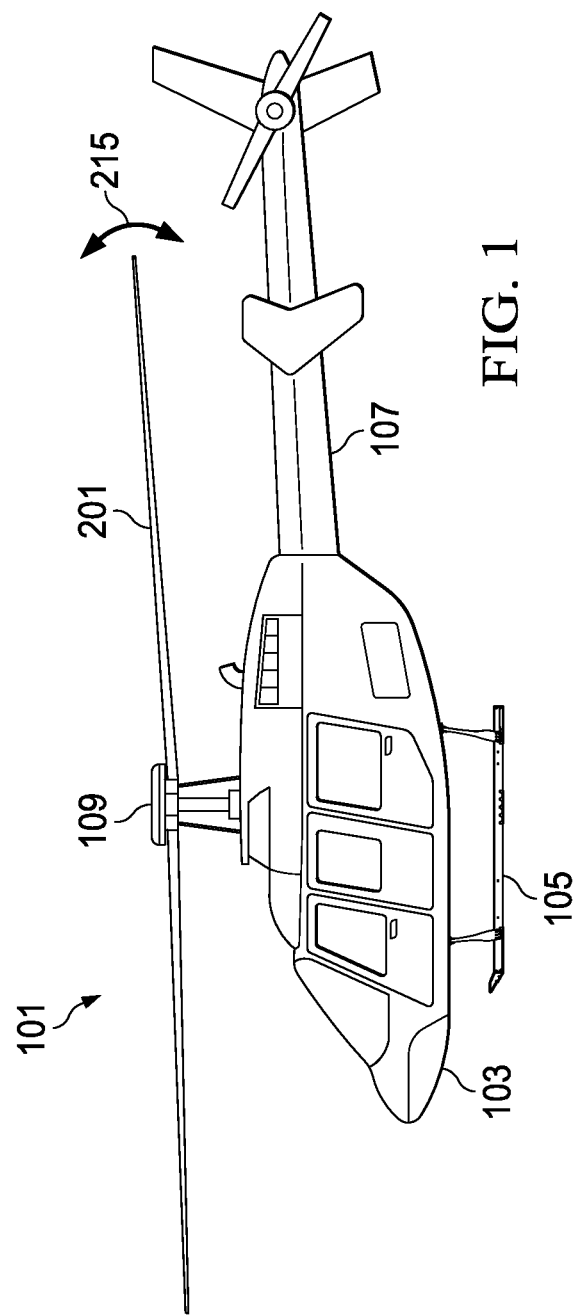
FIG. 1 is a side view of a rotorcraft having a rotor blade, according to an illustrative embodiment.

Referring to FIG. 1, a rotorcraft 101 is illustrated. Rotorcraft 101 includes a fuselage 103, a landing gear 105, a tail member 107, a rotor system 109, and a plurality of rotor blades 201. It should be appreciated that rotorcraft 101 is merely illustrative of a variety of aircraft that can implement the apparatuses and methods disclosed herein. Other aircraft implementations can include hybrid aircraft, tilt rotor aircraft, unmanned aircraft, gyrocopters, and a variety of helicopter configurations, to name a few examples. Further, the methods disclosed herein can be implemented to design and manufacture composite core for a variety of aircraft structural implementations, such as aircraft propellers and wings, for example. Even further, the methods disclosed herein can be implemented to design and manufacture core stiffened structures in non-aircraft implementations, such as space structures, watercraft structures, underwater structures, general transportation vehicle structures, sporting structures, and wind turbine structures, for example.

Figure 2:
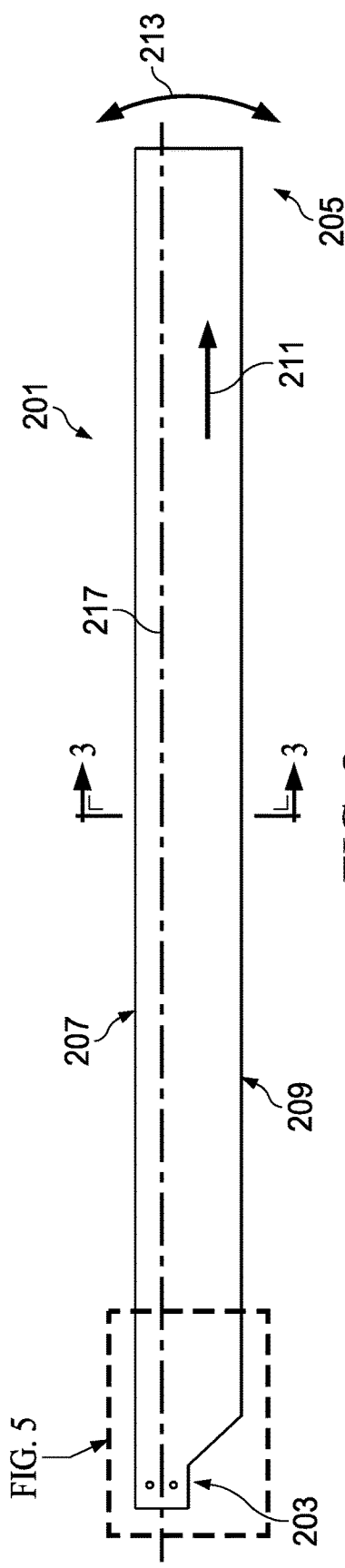
FIG. 2 is an top view of the rotor blade, according to an illustrative embodiment.

Referring now also to FIG. 2, an exemplary rotor blade 201 is illustrated. Rotor blade 201 has a root end 203 and a tip end 205, which define a lengthwise axis therebetween. Rotor blade 201 also has a leading edge 207 and a trailing edge 209, which define a chordwise axis therebetween. It should be appreciated that rotor blade 201 is illustrative only and that alternative embodiments of rotor blade 201 can be configured in a variety of shapes and sizes. For example, one embodiment of rotor blade 201 can include a certain amount of built in twist.

During operation, rotor blade 201 is subjected to a variety of loads to which the rotor blade design must accommodate. For example, of rotorcraft 101 can generate centrifugal forces (schematically illustrated with direction arrow 211), in-plane loads such as lead/lag loads (schematically illustrated with direction arrow 213), out-of-plane loads such flapping loads (schematically illustrated with direction arrow 215 in FIG. 1), and torsional loads of rotor blade 201 such as a twisting about pitch change axis 217. It should be appreciated that even though axis 217 is illustrated as a pitch change axis, axis 217 can broadly be a spanwise axis. Conventionally, the aforementioned dynamic loading causes stress and strains that are primarily reacted by a conventional spar (such as a D-shaped spar) in a conventional rotor blade. However, rotor blade 201 is uniquely configured such that a spar can be eliminated because a core portion is tailored react the dynamic loading in conjunction with the skin members, as discussed further herein. Further, conventional core is homogeneous; however, rotor blade 201 includes core that is tailored in at least one of the chordwise direction, lengthwise direction, and out-of-plane direction. Tailoring the core, as discussed further herein, can be accomplished by varying one or more physical or material characteristics of the core as a function of chordwise location, lengthwise location, and out-of-plane location.

Figure 3:
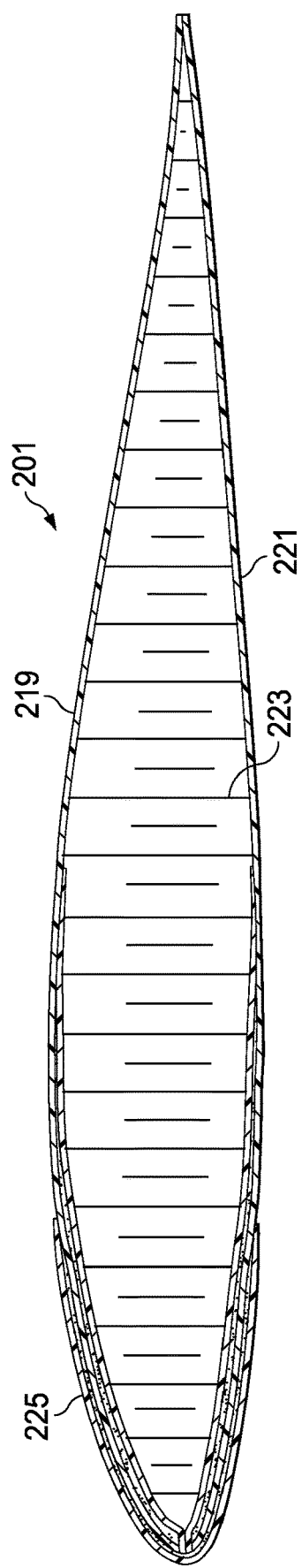
FIG. 3 is a cross-sectional view of the rotor blade, taken from section lines 3-3 in FIG. 2, according to an illustrative embodiment.
Figure 4:
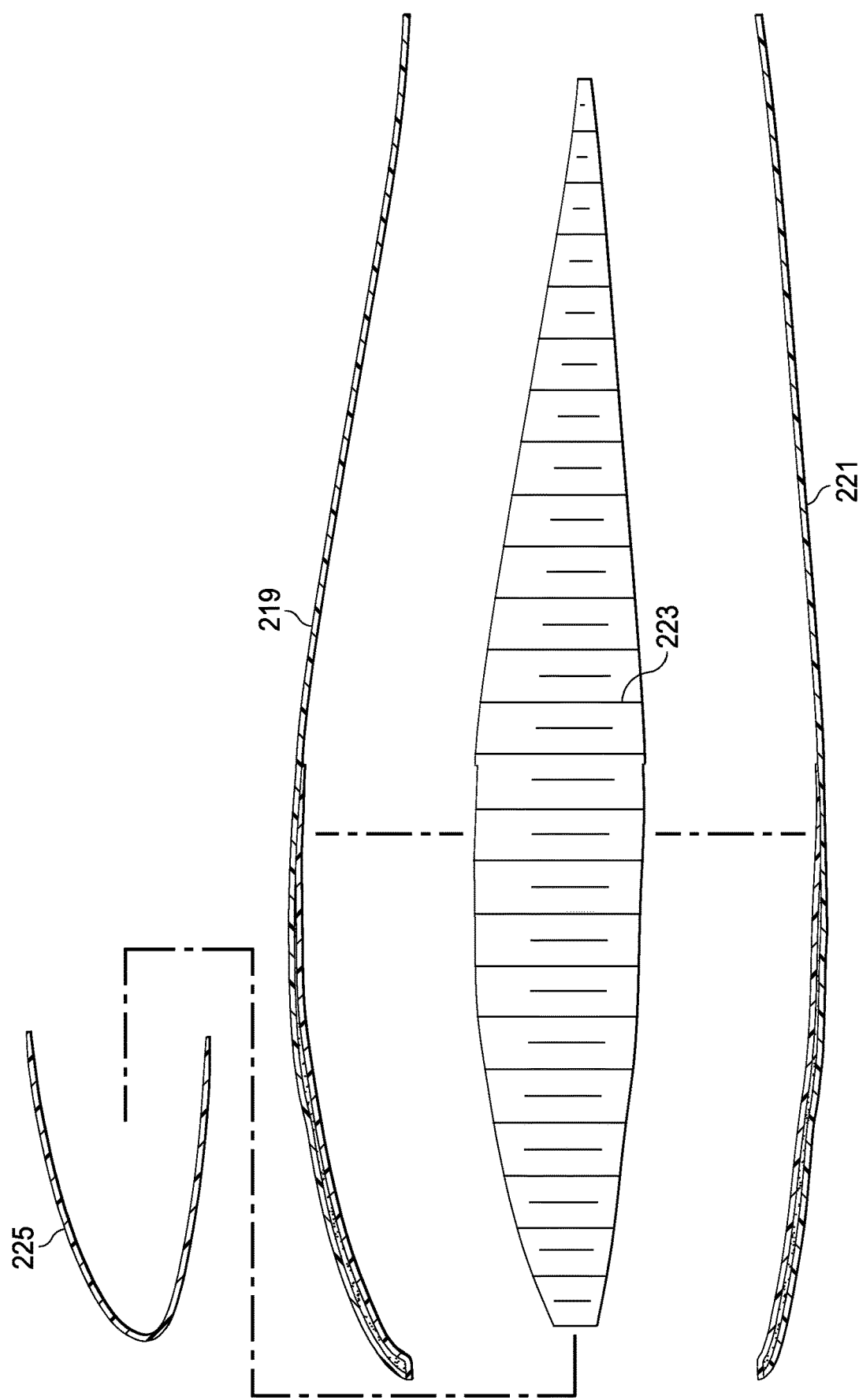
FIG. 4 is an exploded view of the rotor blade, according to an illustrative embodiment.

Referring now also to FIGS. 3 and 4, rotor blade 201 can include an upper skin 219, a lower skin 221, core member 223, and an abrasion strip 225. Upper skin 219 and lower skin 221 can be an assembly of composite layers that are assembled and cured on one or more tools. Upper skin 219 and lower skin 221 can have varying thicknesses and material layups which are implementation specific. In the illustrated embodiment, upper skin 219 and lower skin 221 are "structural skins" in that they function together with core member 223 and abrasion strip 225 as a structural assembly. Upper skin 219, lower skin 221, core member 223, and abrasion strip 225 are preferably bonded together in a single bond cycle. Preferably, core member 223 is bonded to upper skin 210 and lower skin 221 with reticulated adhesive for weight efficiency. In the illustrated embodiment, core member 223 includes large cell carbon core; however, the exact size, shape, and material of core member 223 is implementation specific. Further, core member 223 is illustrated herein as hex-shaped honeycomb core; however, the disclosure herein is not limited to hex-shaped core, rather other core shapes can also be implemented.

Core member 223 is uniquely tailored to have the local and global properties requisite to withstand the loading experienced by rotor blade 201 during operation. In contrast, conventional rotor blades may have core for stiffening one or more portions of a rotor blade, but the core is homogenous and lacking of tailoring. Therefore, a conventional spar is typically required to provide structural integrity to the conventional rotor blade. Core member 223 can be manufactured as a plurality of stacked ribbon-based corrugated elements, or as a matrix of single cellular-based elements, or a combination of both. Regarding the manufacturing of core member 223 as a matrix of single cellular-based elements, see U.S. patent application Ser. No. 13/260,690, published as U.S. Patent Application Publication US 2012/0021165, which is hereby incorporated by reference. Core member 223 can be tailored by exploiting features of composite unidirectional, bias, and tri-axial materials, using their individual and combined physical and mechanical properties in combination with their arrangement in rotor blade 201. Moreover, core member 223 can be tailored by fiber choice, tow-size or slit-width, tow or bundle separation, tow or bundle angle, hybrid mix of fibers, material ply thickness, and/or by ribbon direction or absence of ribbon direction. Further, tailoring can be performed by dictating either a helical component of a core cell by any of the above variables, or adding a similarly tailored corrugated ply in a specific direction, between helical core cell components, or alternately incasing or encapsulating helical core cell components, individually or in groups, to further tailor the mechanical and physical properties of core member 223. Any combination of these variables can be used to created directional stability (strength and/or stiffness), increase shear capability, and tailor the general properties of rotor blade 201. More specifically, the general properties of rotor blade 201 that can be dictated with the tailoring of core member 223 are torsional stiffness, beam stiffness, chord stiffness, and frequency placement. The tailoring of core member 223 can also be used to enhance the ability to effect physical properties, such as center of mass, mass distribution, beam stiffness and chord stiffness about the neutral axis (which can also effect frequency placement).

The tailoring of core member 223 enables core edge tailoring for chord/beam/torsional properties in rotor blade 201. Further, tailoring of core member 223 enables the exploitation of the bias nature of the fiber for directional tailoring of the shear energy between upper skin 219 and lower skin 221. Further, tailoring of core member 223 allows for selectively dictating torsional properties of rotor blade 201 by selecting angle/separation/ribbon direction of core member 223. Tailoring of core member 223 can achieve improved mass balance and tuning opportunity since properties can be achieved in any engineered direction as opposed to using homogenous properties as in conventional rotor blades using homogenous core. Further, the tailoring of core member 223 enhances the ability to utilize traditional "L" and "W" ribbon direction, but also derives additive benefit from the combination of tailoring at the material level, the broadgoods level, the core structure, and the blade structure level.

Specifically to rotor blades, the bias nature of core member 223 provides improved shear capability and enables a redundant torsional load path. In such a rotor blade, the entire core member 223 provides improved shear and redundant torsional load capability, which can eliminate the need for a conventional internal spar member.

Figure 5:
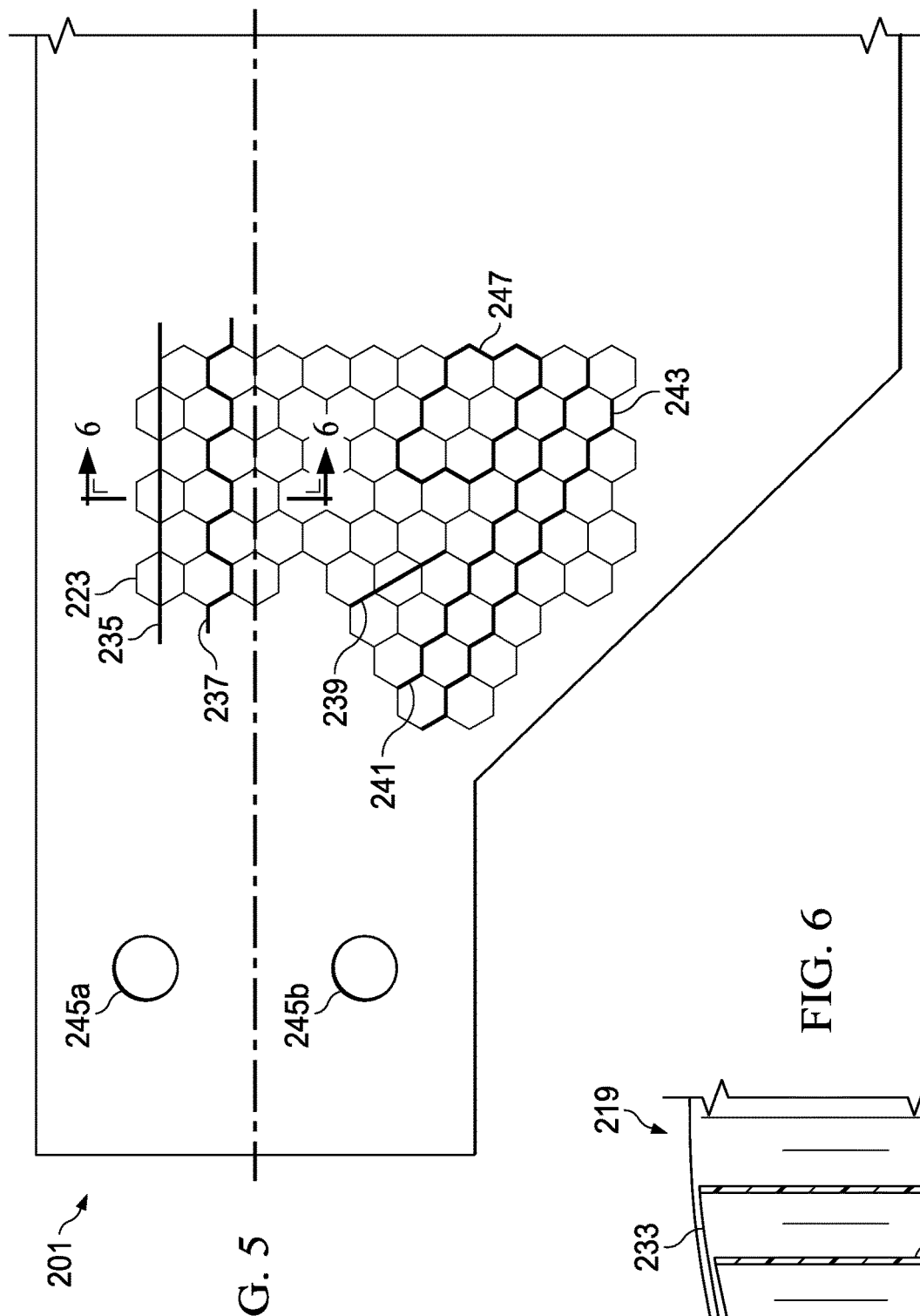
FIG. 5 is a partially removed detail view of the rotor blade, according to an illustrative embodiment.
Figure 6:
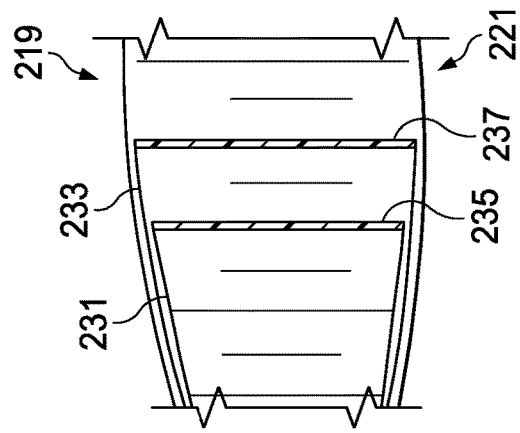
FIG. 6 is a cross-sectional view of the rotor blade, taken from section lines 6-6 in FIG. 5, according to an illustrative embodiment.

Referring now also to FIGS. 5 and 6, one example of the tailoring of core member 223 to provide certain mechanical properties or characteristics in rotor blade 201 is illustrated. Upper skin 219 and lower skin 221 can have ply drop-offs, such as ply drop-offs 231 and 233 that run lengthwise along rotor blade 201. In order to combat a potential stress rise from ply drop-offs 231 and 233, septums 235 and 237 can be located within core member 223 to increase the strength/stiffness of core member 223 in the areas of ply drop-offs 231 and 233. If the core member 223 were a traditional homogeneous core, then the entire core would have to be oversized to react the stress rise of the ply drop-offs, thereby resulting in a non-tailored core that would tend to be too stiff near the trailing edge portion, and negatively move the center of gravity of the rotor blade toward the trailing edge. Similarly, septums 239, 241, and 243 can be located approximately as shown where it is desirable to provide added strength for carrying the tension of in-plane loading toward blade attachment holes 245a and 245b. Septums 235, 237, 239, 241, and 243 can be one or more plies of composite material. The fiber orientation, thickness, etc of the septums can all be specifically tailored for rotor blade 201. Septums 241, 243, and 247 are particularly well suited for use with cellular-based core, while septum 235 is particularly well suited for use with ribbon-based core. Septum 237 can be used in both cellular-base core and ribbon-based core.

In another implementation of tailored core member 223, an enclosed septum 247 can be used to encapsulate and add strength around a plurality of cells form a localized area of tailored characteristics.

Figure 7:
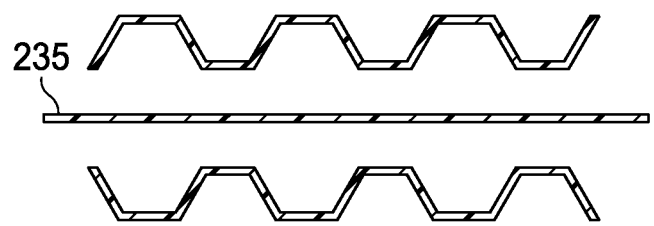
FIG. 7 is a partially exploded schematic view of a method of manufacturing tailored core, according to an illustrative embodiment.
Figure 8:
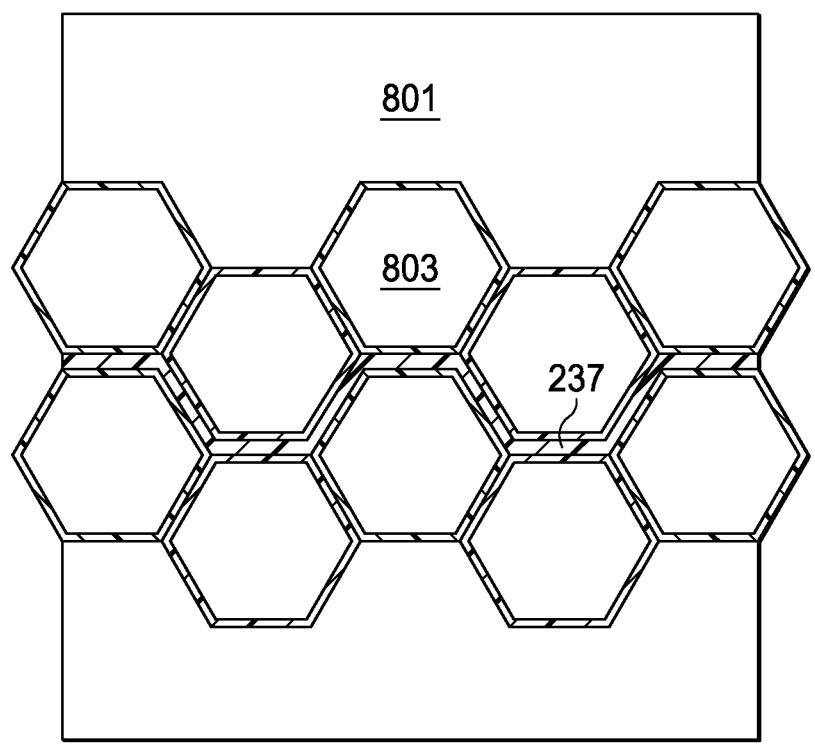
FIG. 8 is a schematic view of a method of manufacturing tailored core, according to an illustrative embodiment.

Referring to FIGS. 7-16, methods of manufacturing tailored core member 223 are schematically illustrated. Referring to FIG. 7, a cross-through septum, such as septums 235 and 239 can be built into core member 223 by either adhesive bonding or co-curing with corrugated layers of composite material, which can also be referred to as ribbon-based core. Also, septums 237, 241, and 243 can be incorporated into core member 223 in such a method. Referring to FIG. 8, a septum, such as septums 237, 241, 243, and 247, can also be incorporated into core member 223 by pressing the septum between cells that are support by mandrels 803 within a mold 801, in a process utilized for making cellular-based core. Each mandrel 803 can have fibers wrapped in any variety of configurations/orientations. The septum (septum 237 being shown by example) can be oriented between cells in any desired configuration.

Figure 10:
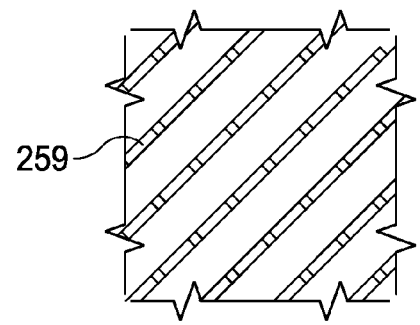
FIG. 10 is a partial view of a fiber orientation in a tailored core, according to an illustrative embodiment.

In another implementation of tailoring core member 223, the fiber angle is customized so that certain portions of core member 223 cause certain desired characteristics, such as beam stiffness, chord stiffness, and torsional stiffness, for example. In one implementation, the composite material is placed to form cell walls of core member 223 such that the fibers are oriented at +/−45° in one portion, while having fibers oriented at +/−30° in another portion, while having fibers oriented at +/−60° in another portion. A first set of fibers are oriented at +45° while a second set of fibers are oriented at −45°. Referring in particular to FIG. 10, cellular-based core can be constructed of just a single angle of fiber 259 wrapped helically around the mandrel. The adjacent cells make a +/− laminate upon assembly into a core block.

Figure 9:
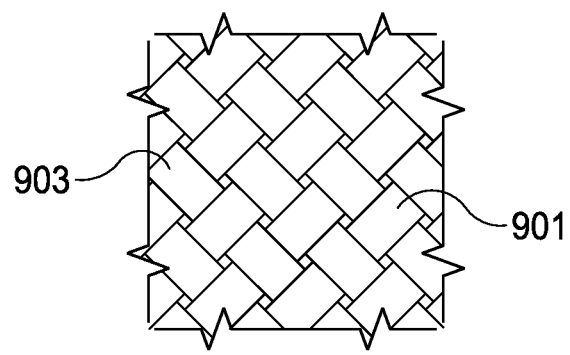
FIG. 9 is a partial view of a fiber orientation in a tailored core, according to an illustrative embodiment.

In an alternative embodiment illustrated in FIG. 9, the first set of fibers 901 and second set of fibers 903 are woven together. Core member 223 can have fibers woven at +/−45° near the leading edge, while having fibers woven at +/−30° near the trailing edge, for example. Further, core member 223 can have fibers woven at +/−60° near root end 203, while having fibers woven at +/−30° near tip end 205. In such a manner, beam stiffness, chord stiffness, torsional stiffness, as well as other characteristics can be customized by tailoring core member 223.

Figure 11:
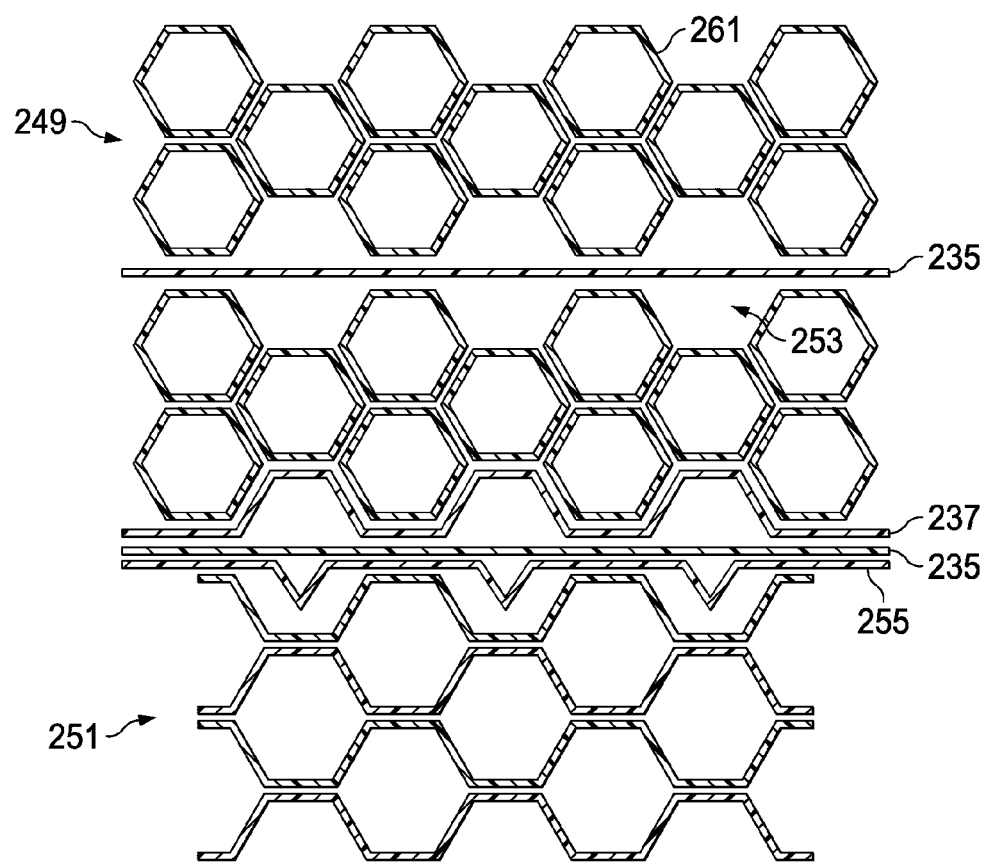
FIG. 11 is a partially exploded schematic view of a method of manufacturing tailored core, according to an illustrative embodiment.

Referring now in particular to FIG. 11, the manufacturing of a core member, such as core member 223, is schematically illustrated. The core member can include a cellular-based core portion 249 or a ribbon-based core portion 251, or a combination of both as illustrated. Each cell member 261 can be bonded together in a manufacturing sequence that also allows for the strategic placement of one or more septums for tailoring purposes. Regarding the cellular-based core portion 249, one embodiment includes generating voids 253 by skipping cell positions, which allows septum 235 to be placed therethrough. Septum 253 can be bonded between adjacent cell members, as illustrated. In another embodiment, a full corrugated septum 237 can be utilized adjacent to the cellular-based core portion 249 or integrated with the ribbon-based core portion 251. An alternative to the full corrugated septum 237 is the partial corrugated septum 255 which doesn't mate with the interior cell walls, like the full corrugated septum 237 does. Also illustrated is septum 235, which is a straight septum.

Figure 12:
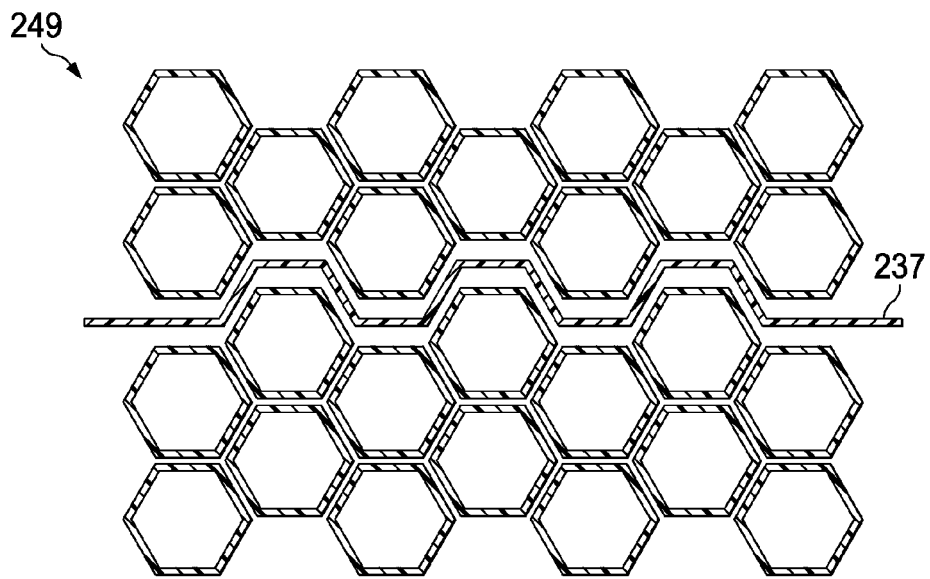
FIG. 12 is a partially exploded schematic view of a method of manufacturing tailored core, according to an illustrative embodiment.
Figure 13:
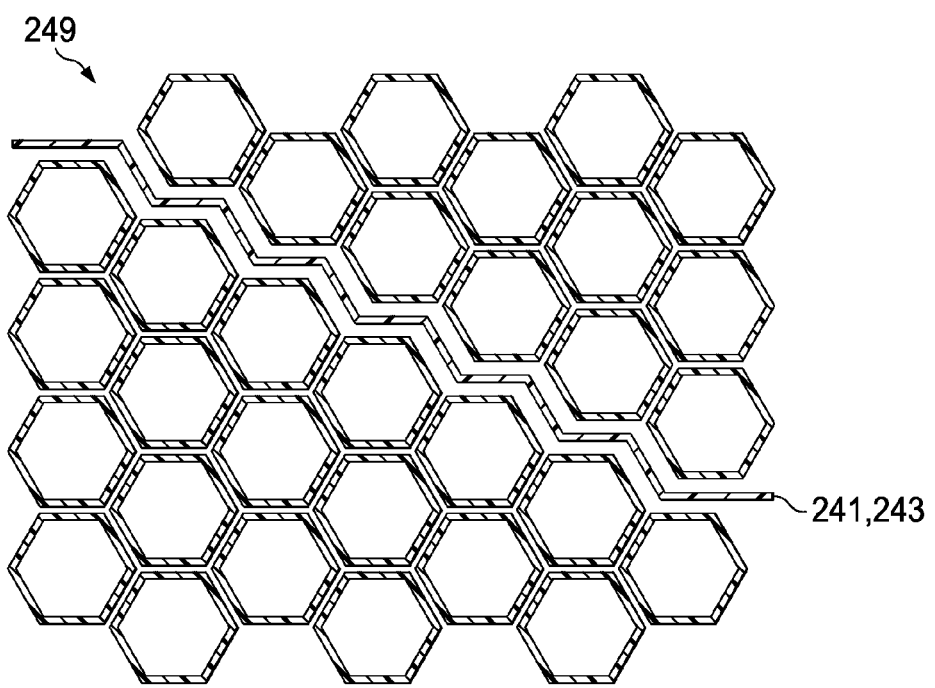
FIG. 13 is a partially exploded schematic view of a method of manufacturing tailored core, according to an illustrative embodiment.
Figure 14:
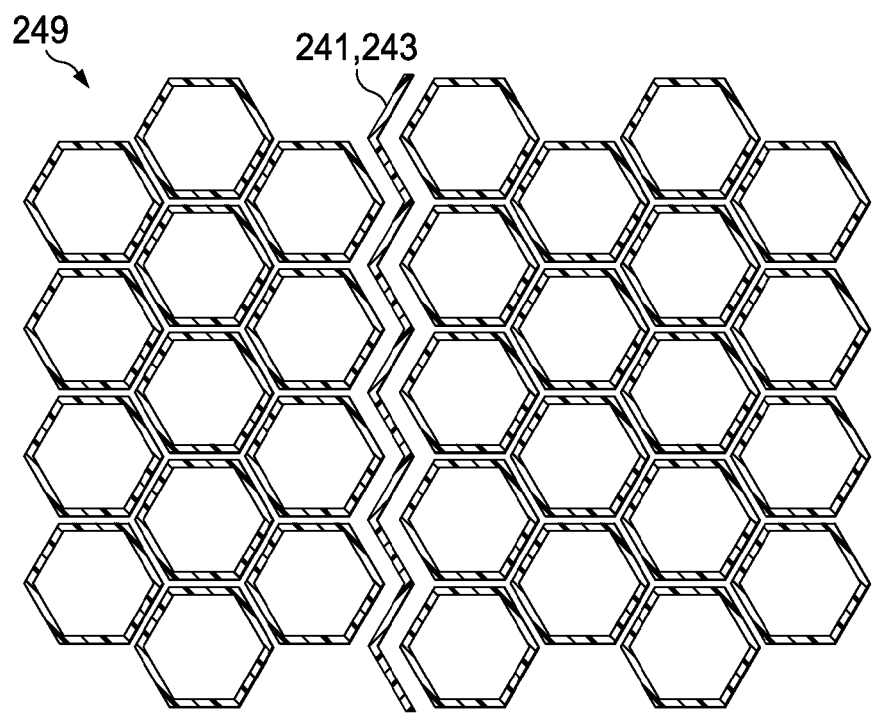
FIG. 14 is a partially exploded schematic view of a method of manufacturing tailored core, according to an illustrative embodiment.

Referring also to FIG. 12, a corrugated septum 237 is illustrated with regard to cellular-based core 249. Referring also to FIGS. 13 and 14, a corrugated septum, such as septums 241, 243, is illustrated in conjunction with cellular-based core 249.

Figure 15:
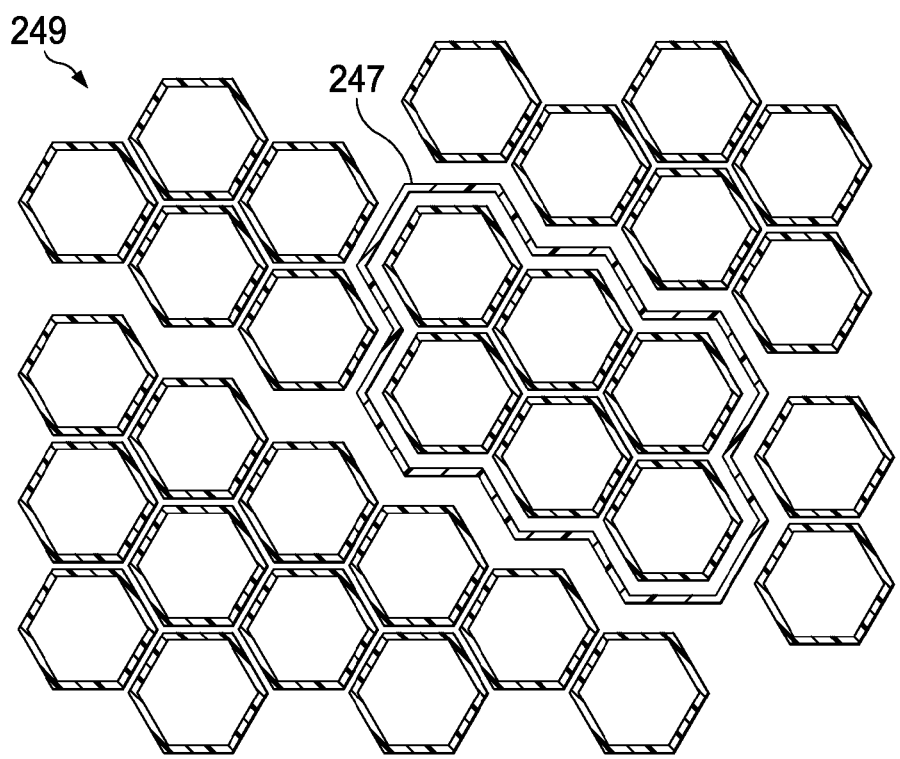
FIG. 15 is a partially exploded schematic view of a method of manufacturing tailored core, according to an illustrative embodiment.

Referring also to FIG. 15, septum 247 is illustrated with regard to cellular-based core 249. Septum 235 can be used to encapsulate a group of cell members during the assembly of cell members to form cellular-based core 249.

Figure 16:
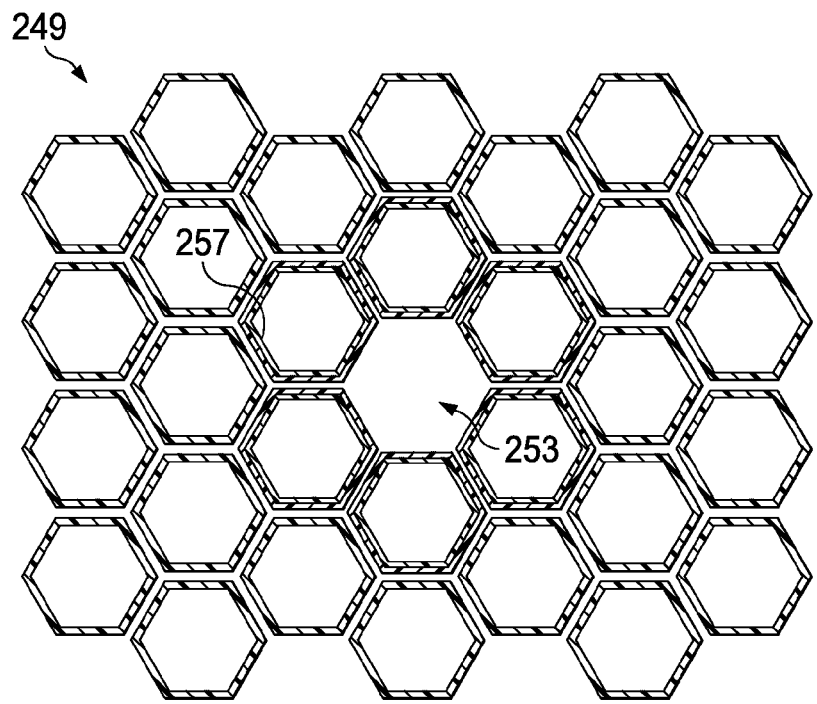
FIG. 16 is a partially exploded schematic view of a method of manufacturing tailored core, according to an illustrative embodiment.

Referring also to FIG. 16, cellular-based core member 249 can have a void 253 within a group of multi-layered cells 257 that have thicker cell walls. The thicker cell walls can be created by assembling a greater number of plies of composite material, as compared to other cell members. Such an embodiment can be an alternative to encapsulating a group of cell members with septum 235.

Figure 17:
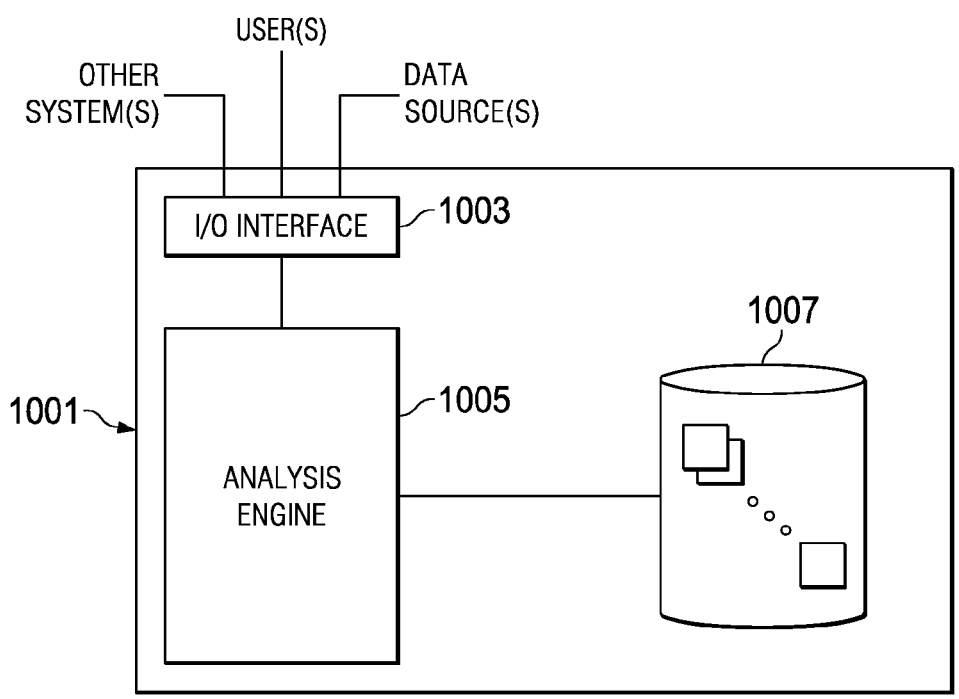
FIG. 17 is a schematic block diagram of a computer system, according to an illustrative embodiment of the present application.

Referring now to FIG. 17, a computer system 1001 is schematically illustrated. System 1001 is configured for performing one or more functions with regard to methods disclosed herein with regard to tailoring the characteristics of core member 223 and rotor blade 201, as well as other methods or processes described herein.

The system 1001 can include an input/output (I/O) interface 1003, an analysis engine 1005, and a database 1007. Alternative embodiments can combine or distribute the input/output (I/O) interface 1003, analysis engine 1005, and database 1007, as desired. Embodiments of the system 1001 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 1003 can provide a communication link between external users, systems, and data sources and components of the system 1001. The I/O interface 1003 can be configured for allowing one or more users to input information to the system 1001 via any known input device. Examples can include a keyboard, mouse, touch screen, and/or any other desired input device. The I/O interface 1003 can be configured for allowing one or more users to receive information output from the system 1001 via any known output device. Examples can include a display monitor, a printer, and/or any other desired output device. The I/O interface 1003 can be configured for allowing other systems to communicate with the system 1001. For example, the I/O interface 1003 can allow one or more remote computer(s) to access information, input information, and/or remotely instruct the system 1001 to perform one or more of the tasks described herein. The I/O interface 1003 can be configured for allowing communication with one or more remote data sources. For example, the I/O interface 1003 can allow one or more remote data source(s) to access information, input information, and/or remotely instruct the system 1001 to perform one or more of the tasks described herein.

The database 1007 provides persistent data storage for system 1001. While the term "database" is primarily used, a memory or other suitable data storage arrangement may provide the functionality of the database 1007. In alternative embodiments, the database 1007 can be integral to or separate from the system 1001 and can operate on one or more computers. The database 1007 preferably provides non-volatile data storage for any information suitable to support the operation of the system 801, including various types of data discussed further herein.

The analysis engine 1005 can be configured for analyzing stress and strain of rotor blade 201 during the design phase. Further, the analysis engine 1005 can be configured to optimize the tailoring of core member 223, and other rotor blade components, such as upper skin 219 and lower skin 221. The analysis engine 223 can be configured to analyze and optimize the tailoring characteristics of core member in conjunction with one or more criteria, such as beam stiffness, chord stiffness, and torsional stiffness. The analysis engine 1005 can include various combinations of one or more processors, memories, and software components.

The particular embodiments disclosed above are illustrative only, as the apparatus may be modified and practiced in different but equivalent manners apparent to those skilled in the art having the benefit of the teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. An airfoil member having a root end, a tip end, a leading edge, and a trailing edge, the airfoil member comprising:
   an upper skin;
   a lower skin; and
   a composite core member comprising at least two adjacent cell members, each of the cell members being a hexagonal tubular structure, an upper surface network of the at least two adjacent cell members being bonded to the upper skin, and a lower surface network of the at least two adjacent cell members being bonded to the lower skin, wherein the at least two adjacent cell members are generally tubular;
   wherein a planar or bent planar septum is disposed laterally between the at least two adjacent cell members, the planar or bent planar septum being configured to provide tailored characteristics of the airfoil member;
   wherein the planar or bent planar septum does not separate the upper surface network from the upper skin and wherein the planar or bent planar septum does not separate the lower surface network from the lower skin; and
   wherein each of the at least two adjacent cell members are in contact with a substantially vertical wall of the planar or bent planar septum and at least one of the upper skin and the lower skin.

2. The airfoil member according to claim 1, wherein the airfoil member is a rotor blade.

3. The airfoil member according to claim 1, wherein the airfoil member is a wing for an aircraft.

4. The airfoil member according to claim 1, wherein the planar or bent planar septum includes a layer of composite material in a corrugated geometry located between the at least two adjacent cell members, the planar or bent planar septum extending in a direction from the root end toward the tip end of the airfoil member.

5. The airfoil member according to claim 1, wherein the planar or bent planar septum includes a layer of composite material that is rectilinear and traverses through an interior of additional cells in an alternating manner.

6. The airfoil member according to claim 5, wherein the planar or bent planar septum is oriented in a direction from the root end toward the tip end located between the at least two adjacent cell members.

7. The airfoil member according to claim 6, wherein airfoil member is a rotor blade and wherein the planar or bent planar septum is configured to oppose centrifugal force loads.

8. The airfoil member according to claim 1, wherein the planar or bent planar septum includes a layer of composite material that laterally encloses at least one of the at least two adjacent cell members.

9. The airfoil member according to claim 1, wherein the planar or bent planar septum includes a layer of composite material that is rectilinear and traverses through an interior of additional cells in an alternating manner, the planar or bent planar septum being oriented at an angle to a spanwise axis of the airfoil member.

10. The airfoil member according to claim 9, wherein the airfoil member is a rotor blade and wherein the planar or bent planar septum is configured to oppose in-plane loading of the airfoil member.

11. The airfoil member according to claim 10, wherein the in-plane loading is due to a lead/lag operational motion.

12. The airfoil member according to claim 1, wherein the planar or bent planar septum includes a layer of composite material that is rectilinear and traverses through an interior of additional cells in an alternating manner, and wherein the planar or bent planar septum is located near a reduction of a thickness in the upper skin.

13. The airfoil member according to claim 1, wherein the planar or bent planar septum includes a layer of composite material that is rectilinear and traverses through an interior of additional cells in an alternating manner, and wherein the planar or bent planar septum is located near a reduction of a thickness in the lower skin.

14. The airfoil member according to claim 1, wherein the planar or bent planar septum includes a layer of composite material that is rectilinear and traverses through an interior of additional cells in an alternating manner, and wherein the planar or bent planar septum is located near a reduction of a thickness of at least one of the upper skin and the lower skin, the reduction in thickness extending in a spanwise direction.

15. The airfoil member according to claim 1, wherein the composite core member includes additional cells near the root end having fibers that are oriented at a first angle, and cells near the tip end having fibers that are oriented at a second angle.

16. The airfoil member according to claim 15, wherein the fibers oriented at the first angle in the additional cells near the root end produce a first torsional stiffness, while the fibers at the second angle in the additional cells near the tip end produce a second torsional stiffness.

17. A method of optimizing the structural properties of a core-stiffened airfoil member, the method comprising:
    assembling composite material to form a composite core comprising at least two adjacent cell members and at least one planar or bent planar septum disposed between the at least two adjacent cell members, each of the cell members being a hexagonal tubular structure, the planar or bent planar septum having a layer of composite material; and
    locating the composite core in an airfoil assembly such that the planar or bent planar septum is located in a position to provide a desired structural characteristic;
    wherein the at least two adjacent cell members are generally tubular and wherein the planar or bent planar septum does not contribute to vertically enclosing either of the at least two adjacent cell members; and
    wherein each of the at least two adjacent cell members are in contact with a substantially vertical wall of the planar or bent planar septum and at least one of an upper skin and a lower skin.

18. The method according to claim 17, wherein the position of the planar or bent planar septum generally corresponds with a spanwise direction of the airfoil member.

19. The method according to claim 17, wherein the planar or bent planar septum encircles at least one of the at least two adjacent cell members.

* * * * *